United States Patent [19]

Furuya

[11] Patent Number: 4,764,920
[45] Date of Patent: Aug. 16, 1988

[54] PACKET TRANSMISSION SYSTEM

[75] Inventor: Yukitsuna Furuya, Tokyo, Japan

[73] Assignee: NEC Corporation, Tokyo, Japan

[21] Appl. No.: 719,530

[22] Filed: Apr. 3, 1985

[30] Foreign Application Priority Data

Apr. 4, 1984 [JP] Japan .................................. 59-67112
Apr. 4, 1984 [JP] Japan .................................. 59-67113

[51] Int. Cl.⁴ .............................................. H04J 3/02
[52] U.S. Cl. ....................................... 370/94; 370/85;
370/95; 340/825.51
[58] Field of Search ....................... 370/94, 93, 95, 60,
370/85, 66, 67, 89; 340/825.5, 825.51

[56] References Cited

U.S. PATENT DOCUMENTS 4,063,220 12/1977 Metcalfe et al. .
4,516,239 5/1985 Maxemchuk .......................... 370/85
4,542,499 9/1985 Bella et al. ............................ 370/85

OTHER PUBLICATIONS

Ono et al., "Priority Based Packet Reservation Demand Assignment TDMA System", Electronics & Comm. in Japan, vol. 66-B, No. 4, 1983, pp. 75-83.
Tobagi, Fouad A., "Multiaccess Protocols in Packet Communication Systems" IEEE Transactions on Communications, vol. COM-28, No. 4, Apr. 1980.

Primary Examiner—Douglas W. Olms
Assistant Examiner—Wellington Chin
Attorney, Agent, or Firm—Foley & Lardner, Schwartz, Jeffery, Schwaab, Mack, Blumenthal & Evans

[57] ABSTRACT

A multiaccess packet transmission system for transmitting both bursty and periodical packets. A packet detection circuit detects the arrival of a first periodical packet and predicts the time of arrival of the next periodical packet for reserving the transmission path at the predicted time. Bursty packets are transmitted only when the transmission path is idle and not reserved.

6 Claims, 4 Drawing Sheets

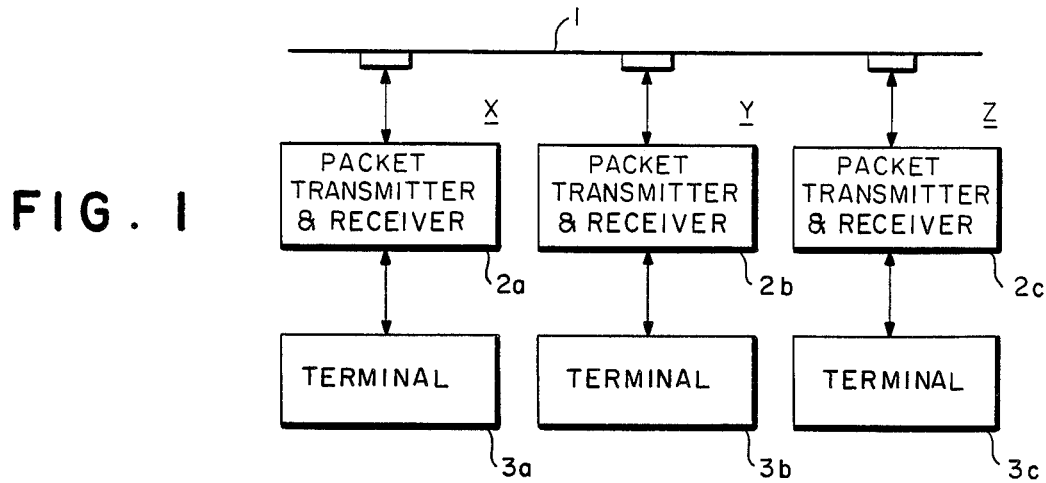
FIG. 1
FIG. 2
| PREAMBLE | DEST. ADDR. | SOURCE ADDR. | TYPE FIELD | DATA FIELD | CRC |
|---|---|---|---|---|---|
| 64 | 48 | 48 | 16 | 8n | 32 |
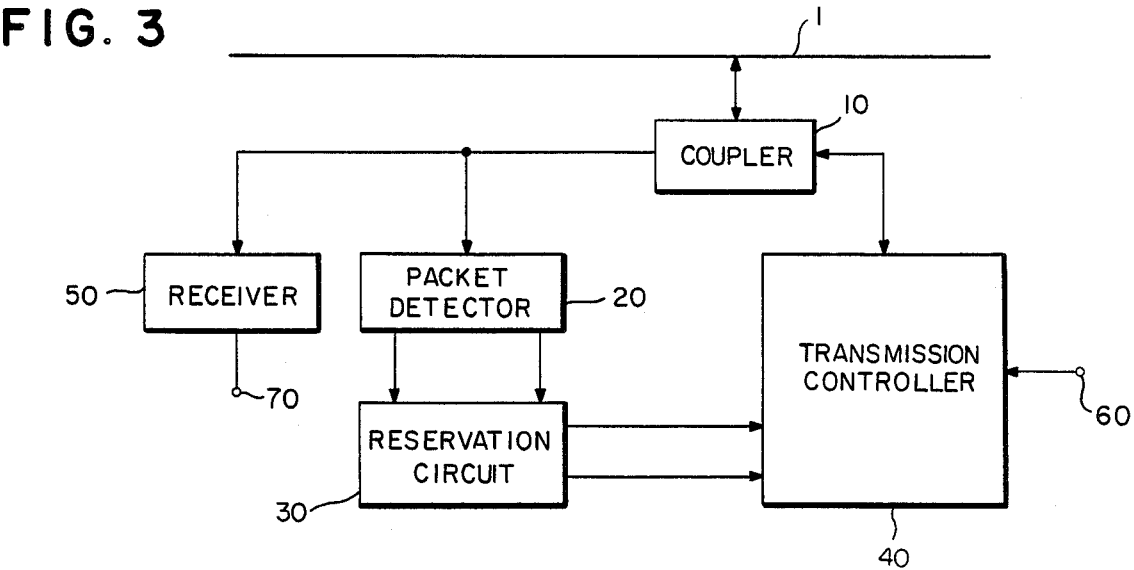
FIG. 3

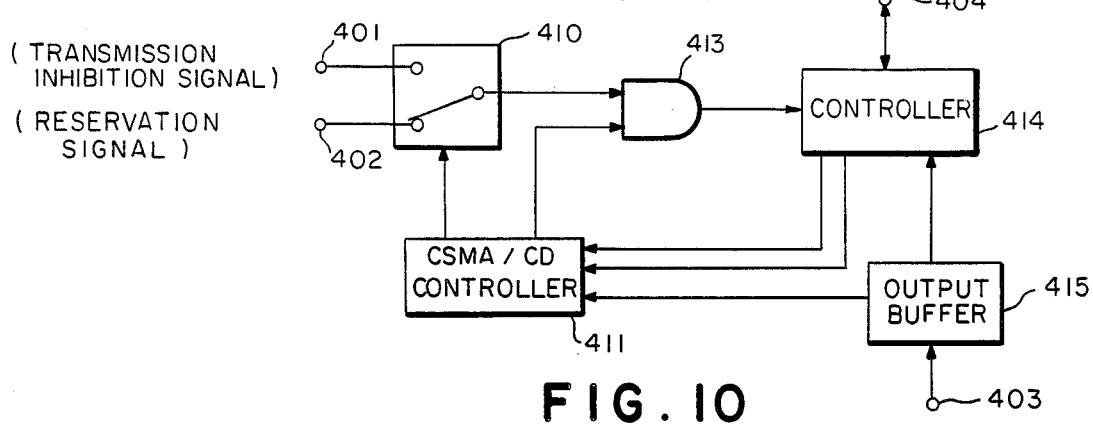
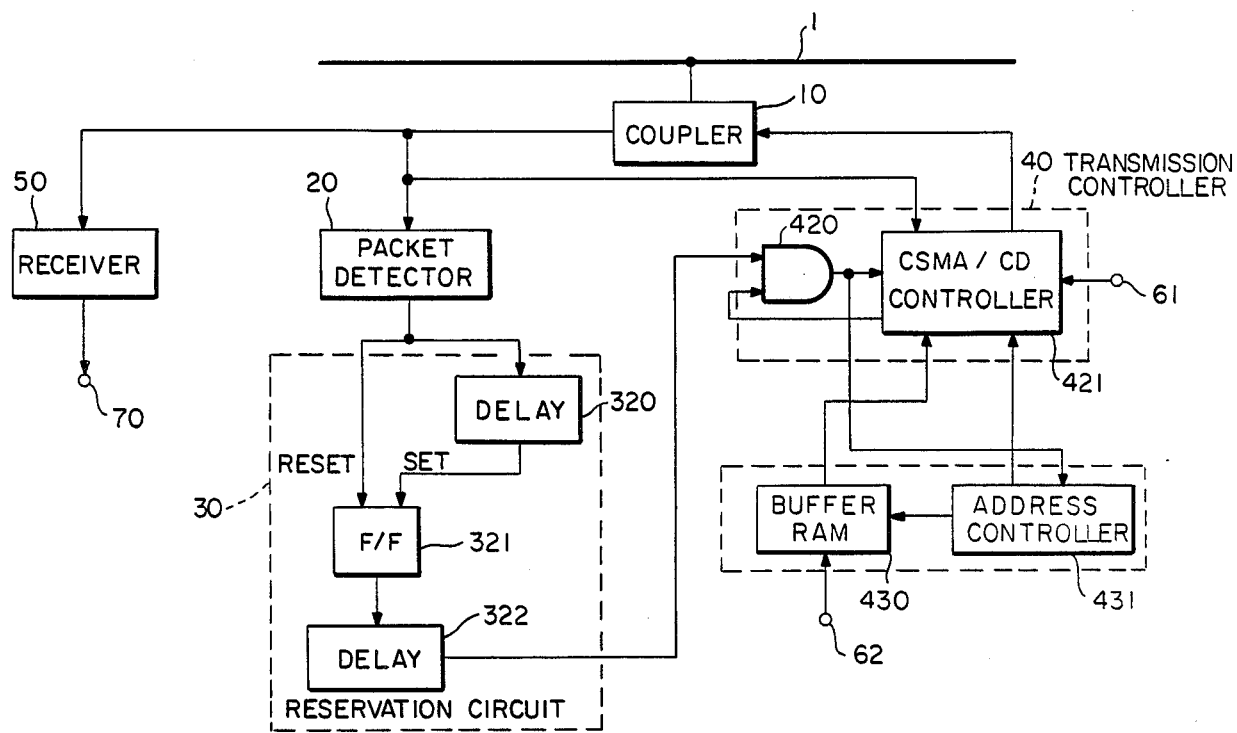
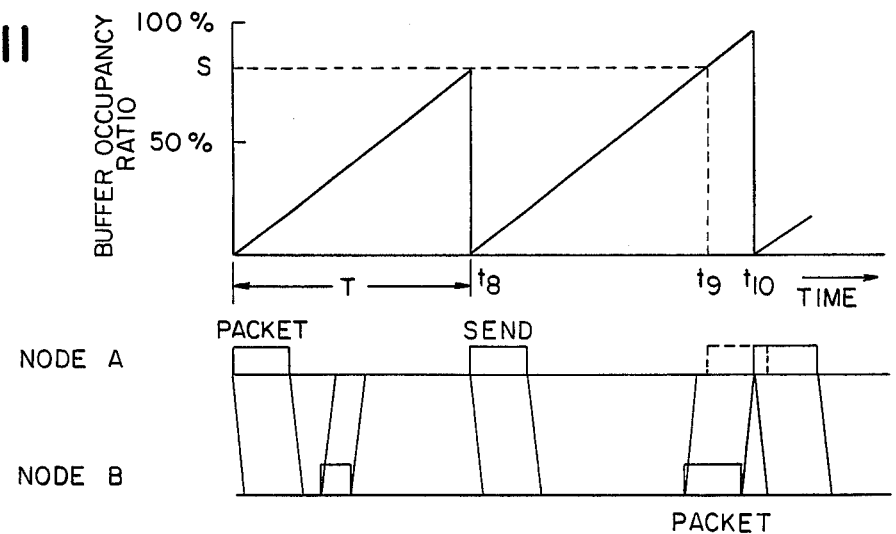

PACKET TRANSMISSION SYSTEM

BACKGROUND OF THE INVENTION

1. Field of the Invention

This invention relates to a packet transmission system to be used in a packet communication system wherein both bursty traffic such as data and periodical traffic such as a voice signal, a video signal or a pictorial image (collectively referred to as voice hereinafter) coexist in a multiaccess channel.

2. Description of the Prior Art

In recent years much efforts have been paid to the development of a local area network system where plural computers are connected to a newtork so as to share a file and a printer or to share traffic loads in the network. Since information to be transmitted is bursty in such a system, there is often used a random-access control technique which allows nodes having data to gain access at random to a common bus for transmission of packets without establishing dedicated channels respectively among individual nodes. Various random access techniques are introduced in "Multiaccess Protocols in Packet Communication System" by Fouad A. Tobagi, IEEE Transactions on Communications, Vol. COM-28, No. 4, April 1980. The ALOHA protocol, Carrier Sense Multiple Access (CSMA) protocol, Carrier Sense Multiple Access with Collision Detection (CSMA/CD) protocol which are mentioned in the above article achieve high reliability and less propagation delay since communication control functions are not centralized but distributed among nodes. These random access techniques are therefore extremely effective when data is generated at burst and the amount of traffic is small.

When those conventional techniques are applied to a network system of a so-called ISDN type (integrated service digital network) or a multiaccess system where the bursty traffic and periodical traffic coexist, however, delay amounts tend to fluctuate. As a result, voice quality in the communication in which realtime processing is highly required, is deteriorated. Further, as the traffic increases, collision among packets increases to make reliable data transmission impossible.

Referring to FIGS. 1 and 2, the above-mentioned disadvantages will be described by focusing on a CSMA/CD technique-employing system disclosed in U.S. Pat. No. 4,063,220.

Referring to FIG. 1, nodes X, Y and Z connected by a bus 1 are equipped with packet transmitter/receivers 2a, 2b and 2c and terminals 3a, 3b and 3c, respectively. The terminals 3a, 3b, and 3c access the bus 1 via the transmitter/receivers 2a, 2b and 2c which function to transmit packets from the terminals 3a, 3b and 3c to the bus 1 at an appropriate timing or selectively take out of the received packets the packets addressed to these particular terminals 3a, 3b and 3c and transmit them thereto, respectively.

Referring now to FIG. 2, a format of a packet transmitted from the nodes X, Y and Z comprises 64 bits in preamble, 48 bits in destination address, 48 bits in source address, 16 bits in type field which expresses the type of data, 8n bits ($n=46-1500$) in the data field, and 32 bits in circular redundancy check (CRC).

The CSMA/CD protocol will be briefly explained. Out of the nodes X, Y and Z, the node Y which intends to transmit data senses whether the bus 1 is idle. If the bus 1 is idle, the node Y adds a destination address to the data signal and transmits the packet shown in FIG. 2 onto the bus 1. This packet is transmitted in both directions of the bus 1. Each of the nodes X and Z continuously monitors the destination address of the packet. If said address is destinated to its own node, the node takes the packet.

Assuming now that the nodes Y and Z have information to transmit to the node X, both nodes Y and Z sense whether the bus 1 is idle. If the node Y senses that the bus 1 is idle, a packet addressed to the node X, is transmitted from the node Y. At almost the same time, if the node Z senses that the bus 1 is idle, a packet addressed to the node X is transmitted from the node Z. Both nodes Y and Z then detect data collision, and, at the same time, abort their transmission of packets respectively, wait for an interval of a random time, and then re-transmit packets in accordance with the above-mentioned protocol.

The above-mentioned CSMA/CD protocol is quite successful to achieve a high throughput at a small probability of collision when the length of the bus 1 is short and the propagation delay can be negligibly small in comparison with the packet length. However, since the length of the bus 1 reaches a certain level, the propagation delay becomes significant, and the number of collisions suddenly increases with a concurrent high fluctuation in the waiting-time interval between the transmissions of packets.

If a certain duration of time elapses in waiting, that is handled as a packet loss in the voice communication where the requirement for the real-time processing is quite strict. Therefore, that much fluctuation will consequently degrade the voice quality.

The protocol of a so-called priority control is often utilized to avoid such inconvenience. The protocol gives a higher priority to voice packets to facilitate their transmission. However, the above-described collision unavoidably occurs among voice packets. Consequently, the waiting-time interval fluctuats to make the throughput as a whole unsatisfactory.

SUMMARY OF THE INVENTION

An object of this invention is, therefore, to provide a packet transmission system free from the above-mentioned disadvantages encountered in the prior art to achieve a high throughput of a whole system by making reservation for periodical packets so that the collision between the bursty and periodical packets can be avoided.

In order to achieve such an object, there is provided a transmission system for use in a packet communication system of multiaccess type where periodical traffics and bursty traffics coexist. The system includes packet detection means for detecting a periodical packet which carries the periodical traffic on a transmission path; means for predicting the arrival time of the next packet in response to the detection of the periodical packet by said packet detecting means and reserving transmission path for the time; and means for transmitting the bursty packet which carries the bursty traffic when the transmission path is idle and not reserved.

BRIEF DESCRIPTION OF THE DRAWINGS

The present invention will be described in conjunction with the accompanying drawing in which:

FIG. 1 is a block diagram of an example to which the present invention is applied;

FIG. 2 is a structural view of a packet used in the invention;

FIG. 3 is a block diagram of an embodiment of the present invention;

FIG. 9 is a block diagram of a transmission controller shown in FIG. 3.

FIG. 10 is a block diagram of another embodiment of the invention; and

FIG. 11 is a diagram for describing the operation of the embodiment shown in FIG. 10.

In the drawings, the same reference numerals denotes the same structural elements in the above figures.

DETAILED DESCRIPTION OF THE EMBODIMENTS

Figure 4:
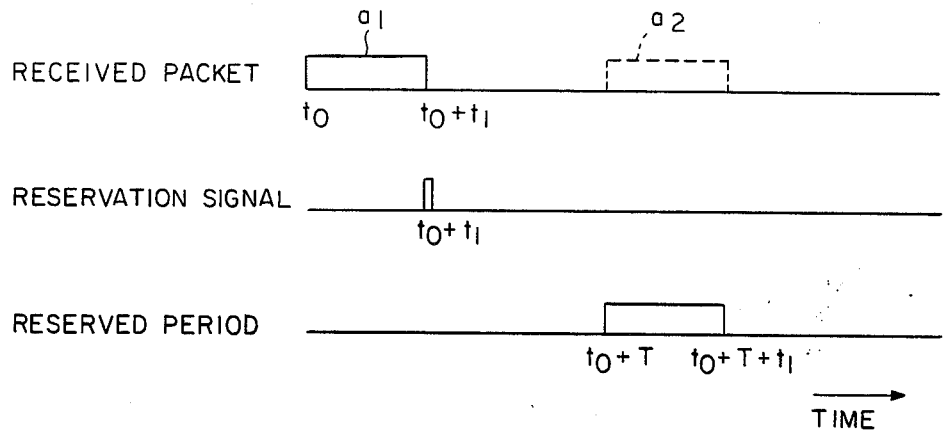
FIGS. 4 through 6 are diagrams for describing the first embodiment of the invention.

Referring to FIG. 3, an embodiment of the invention includes a bus 1 for transmitting signals in bit serial, format a coupler 10 connected to the bus 1, a packet detector 20 for detecting periodical packets on the bus 1, a reservation circuit 30 for predicting the arrival time of the next packet in response to the detection of the periodical packets by the detector 20 and for reserving the bus 1 for the time period, a transmission controller 40 for controlling the transmission of incoming signals 60 by CSMA/CD protocol based upon the signals from the circuit 30, and a receiver 50 for receiving packet from the bus 1 and outputting them to a terminal 70. The signals from the controller 40 are transmitted to the bus 1 and the detector 20 via the coupler 10, and at the same time the coupler 10 takes in the packet which is streaming on the bus 1 from other transmitters/receivers to feed the packet to the detector 20 and the receiver 50. The detector 20 checks the type field of the packet, for instance, of the format shown in FIG. 2. If the detector 20 detects a periodical packet (description will hereinafter given to the case of a voice packet which is typical of the type), the detector 20 checks the source address of the packet to transmit a reservation pulse to the circuit 30. The reservation pulses can be classified into two types; one is the first control pulse which inhibits the transmission of packets of its own node when a voice packet of another node is detected, and the other is the second control pulse which reserves the circuit for the transmission of the next voice packet after it transmits a voice packet of its own node.

When the circuit 30 receives a reservation pulse from the detector 20, since the next packet is expected to be received or transmitted after a predetermined time, it forms a reservation signal (or transmission inhibition signal) to either transmit or abort the next packet at the predicted time and transmits it to the controller 40. The controller 40 transmits the voice packet out of the packets received from the terminal 60 within the time reserved in accordance with CSMA/CD protocol while it transmits the data packet (which is generally a random traffic) in accordance with CSMA/CD protocol only when the transmission is not inhibited by the reservation signal. The received packets are detected by the receiver 50 and outputted from the terminal 70. Before proceeding into detailed description of the transmission path, the flow of the signals on the bus 1 of the system according to the invention will be explained referring to FIGS. 3 and 4.

A reservation signal to the voice packet $a_1$ of the length $t_1$ which is received at the time $t_0$ is provided to the circuit 30 from the detector 20 at the time $t_0+t_1$. If the propagation delay within the system is sufficiently small, the circuit 30 makes a reservation based upon the reservation signal at a time later than the time $t_0$; by the packet arrival interval T.

The circuit 30 outputs a signal "0" to the controller 40 to indicate that the bus 1 is reserved from the time $t_0+T$ to $t_0+T+t_1$. The controller 40 controls so as to transmit a packet only when the output from the circuit 30 indicates "1", or in other word, when the time is not reserved in addition to the packet control function in accordance to CSMA/CD protocol.

Each node is controlled therefore to transmit only when the circuit is idle and not reserved to thereby enable avoiding of the collision between the voice packet $a_2$ subsequent to the packet $a_1$ and the packet of its own node.

Figure 5:
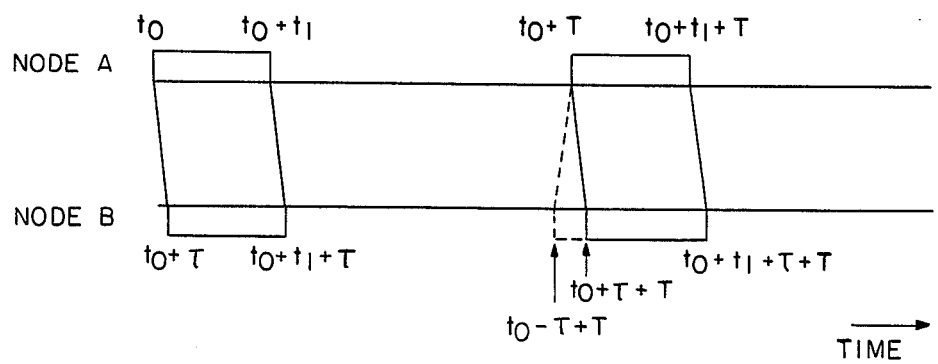

FIG. 5 shows the time reservation when the delays between nodes cannot be ignored in comparison of the length of the packet. A packet having the length $t_1$ transmitted from the node A at the time $t_0$ arrives at the node B at the time $t_0+\tau$ with the delay $\tau$. The node B predicts that the next packet will arrive at the time $t_0+\tau+T$. Due to the delay, however, if a packet is transmitted at a time later than the time $t_0-\tau+T$, the packet will collide with a packet transmitted from the node A. In order to avoid such a collision, the reservation time should be started from the time $T_0-\tau+T$.

This arrangement inhibits the transmission of packets by the node B after the time $t_0-\tau+T$. The packet which starts transmission before the time $t_0-\tau+T$, arrives at the node A before the time $t_0+T$, the node A detects the packet from the node B to put off the transmission of a packet of its own node. The collision between the voice packet and other packets can be avoided by this arrangement.

It is generally difficult to obtain all the propagation delays among nodes. In such a case, the procedure can be simplified by storing the maximum delay $\tau_0$, extending the reservation time by $2\tau_0$ and reserving the interval from the time $t_0+\tau+T - 2\tau_0$ to the time $t_0+t_1+\tau+T$.

Figure 6:
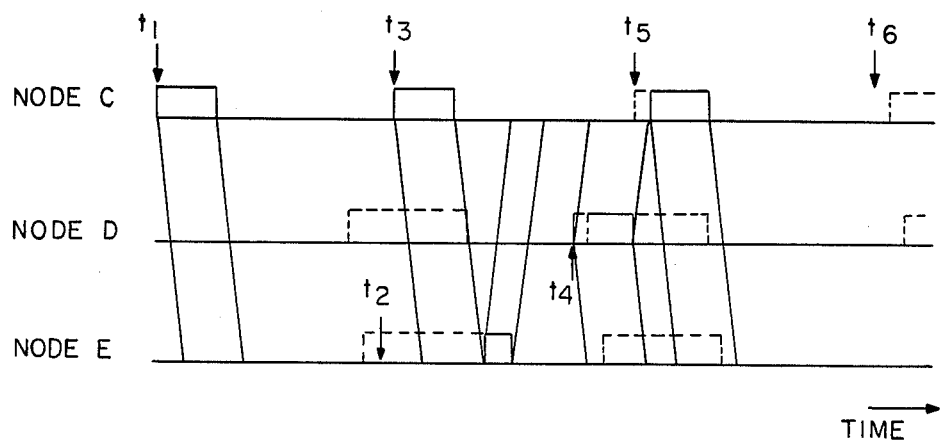

Referring now to FIG. 6, an example of the operation among the three nodes C, D and E according to the invention will now be described. The times $t_1$, $t_2$, $t_3$, $t_4$ and $t_5$ which are marked by arrows in FIG. 6, represent the arrival time of respective packets and oblique lines show the state of the propagation of a packet. The broken lines denote reserved times. It is assumed that voice packets arrive at the node C at a predetermined time interval, and data packets arrive at the nodes D and E at random. When the voice packet arrived at the node C is transmitted at the time $t_1$, each node makes reservation for the next packet based upon the received packet. Even if a data packet arrives at the time $t_2$ at the node E, which is within the reserved time, the node does not transmit any packet until the packet from the node C which arrived at the time $t_3$ has been completely received. Based upon the voice packet transmitted at the time $t_3$, each node makes a new reservation respectively. When a data packet arrives at the node D slightly before the time $t_4$ which is slightly before the reserved time, the node D transmits the packet. Since this packet continues to be received by the node C at the time $t_5$, the node C senses the carrier to start transmission immediately after the completion of the packet from the node D.

On the basis of the packet which is transmitted with the above delay, each node reserves for the next packet. As the node C makes a reservation for the next transmission at a time later than the transmission of the voice packet by the interval between voice packet arrivals, all the subsequent voice packets are made to be transmitted at delayed times. If there is a packet which starts transmission immediately before the reserved time like the packet at the time $t_4$, the voice packet will be further delayed in actual transmission.

It is most preferable in this invention that the maximum length of a data packet is shorter than that of a voice packet. That is because if the length of a data packet which is outputted at the time $t_4$ or slightly before the reserved time is longer than that of a voice packet, it will exceed the reserved time to thereby cancel the reservation signal. The node which has the data to transmit inevitably transmits a packet to cause collison.

The embodiment shown in FIG. 3 enables avoiding of the collision between data packets and voice packets as well as the collision among voice packets. Therefore, the system can attain through the decentralized control the effect equivalent to the circuit switching for voice and to the CSMA/CD for data. The extremely effective utilization of circuits thus can be realized.

The essential portions of the embodiment shown in FIG. 3 will now be described in more detail for the structure and operation thereof.

Figure 7:
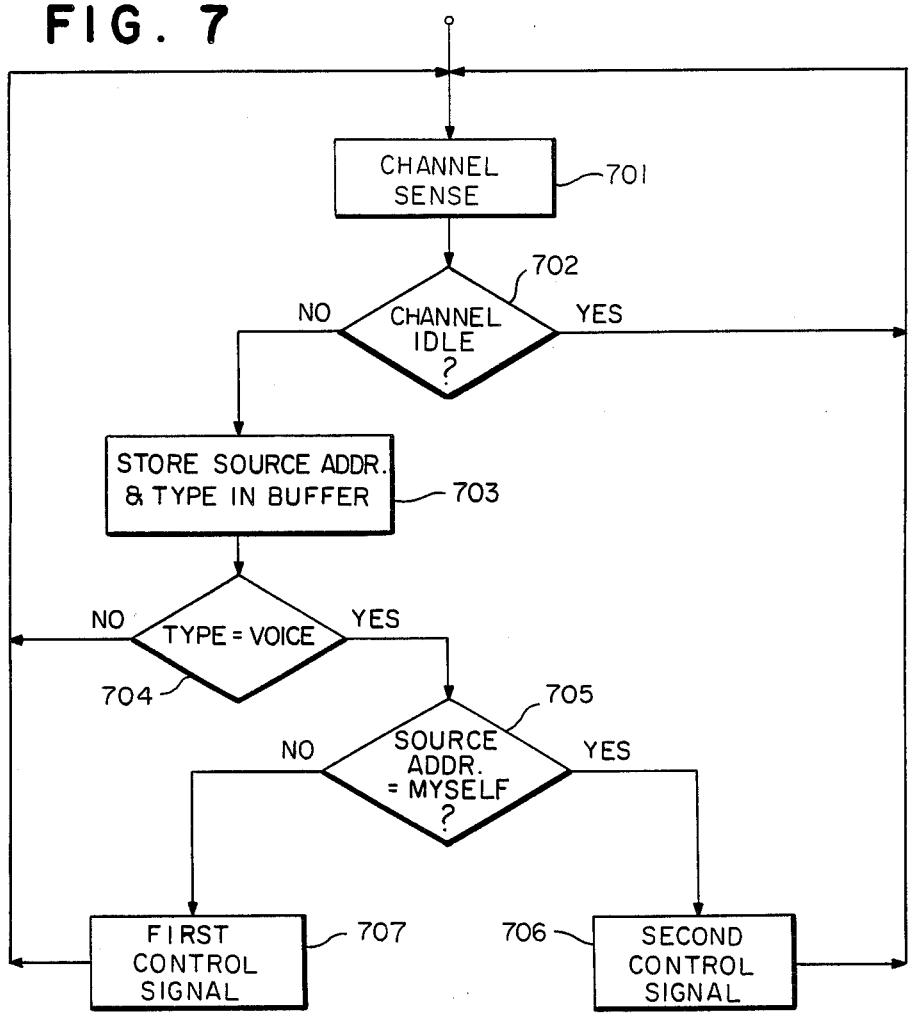
FIG. 7 is a flow chart for illustrating the operation of a packet detector used in FIG. 3.

Referring now to FIG. 7, the operation of the packet detector 20 is described. The detector 20 continuously monitors unoccupied channels on the bus 1, i.e., the idle state of the bus 1 (See steps 701 and 702). When it detects a signal on a channel, it reads out the source address and the type field and stores them in a buffer (step 703). It then checks whether the type field indicates a voice or not (step 704), and if it is not a voice, the detector returns to the channel sense operation. If it is a voice, it checks the source address to find out whether this packet has been transmitted from its own node or not (step 705). If the packet is not of its own address, the detector transmits the first control pulse to abort the packet transmission from itself (step 707) and if it is of its own address, the second pulse is sent out to make a reservation for the next voice packet transmission (step 706) and then returns to the channel sense operation. The first and the second control pulses are collectively referred to as reservation pulses.

Figure 8:
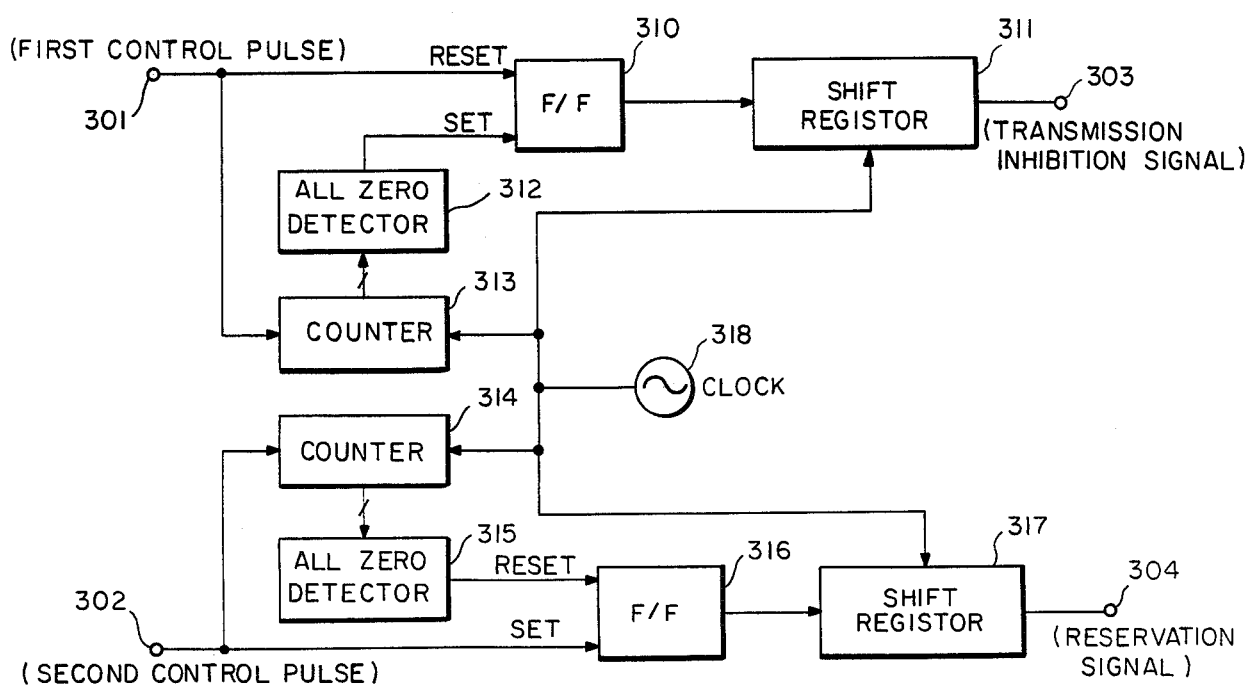
FIG. 8 is a block diagram of a reservation circuit shown in FIG. 3.

Referring to FIG. 8, the reservation circuit 30 receives a first control pulse at an input terminal 301. The first control pulse is the pulse generated when the packet detector 20 detects a voice packet from other nodes. The first control pulse is inputted to a reset terminal of a flip-flop 310. The output of the flip-flop 310 therefore indicates "0" from the time when the first control pulse is received. At the same time the first control pulse is fed to reset a counter 313. When a reset signal is received, the counter 313 is set at an initial value which counts down clock signals from the clock source 318 to zero after $t_1+2\tau_0$ time. The counter 313 continues counting down with the clock signals from the clock source 318. When the values on the counter 318 become all zero, the all zero detector 312 detects it to output a set pulse to the flip-flop 310. In this manner, if the first control pulse is received at the terminal 301, the flip-flop 310 keeps on outputting "0" for the duration of time $t_1+2\tau_0$ and output "1" at other times. The output from the flip-flop 310 is delayed by the time $T-2\tau$ by a shift register 311 and outputted from a terminal 303 as a transmission inhibition signal.

A terminal 302 receives a second control pulse which is the pulse detected when its own node transmits a voice packet. The control signal is sent to a set terminal of the flip-flop 316 and counter 314. In response to the reset signal, the counter 314 is set at an initial value which counts down the clock signal from the clock source 318 to zero after $t_1$ time. When the content of the counter 314 becomes zero, the all zero detector 315 detects it to output a reset pulse to the flip-flop 316. The output of the flip-flop 316 is delayed by a shift register 317 which delays it by the time T and is outputted to an output terminal 304 as a reservation signal.

By the above operation, it is arranged that when a voice packet of another node is detected, a transmission inhibition signal of the length $t_1+2\tau_0$ is outputted from the terminal 303 at the value "0" at a time later by $T-2\tau_0$ from the detection, while when a voice packet of its own node is detected, a reservation signal of the length $t_1$ is outputted at the value "1" from the terminal 304 at a time later by T than the detection.

FIG. 9 shows the details of a transmission controller 40. Input terminals 401 and 402 receive transmission inhibition signals and reservation signals respectively from the terminals 303 and 304 of FIG. 8. When the packet to be transmitted is inputted from the input terminal 403 to an output buffer 415, the CSMA/CD control circuit 411 detects the type of the packet and transmits a control signal to a switch 410. When the control signal indicates the voice packet, the switch 410 selects the a reservation signal from the terminal 402. On the other hand, when the control signal indicates a data packet, the switch selects the transmission inhibition signal from the terminal 401. The selected signal is fed to a AND gate 413. At the same time, the CSMA/CD controller 411 detects the idle state of the bus 1 from carrier sense signals and the collision detection signals from the control circuit 414. If the bus 1 is idle, the CSMA/CD controller provides a transmission command signal to a AND circuit 413. The AND circuit 413 logically combines the transmission command signal and selected signal of the switch 410. The control circuit 414 reads out a packet from the output buffer 415 and outputs from its read-out terminal 404 to the bus when the transmission inhibition signal of the terminal 401 is "1", in other words, when the transmission command comes at non reserved time. Similarly, it transmits packets only when the reservation signal from the terminal 402 is "1" for voice packet transmission.

Since the details of the CSMA/CD control circuit 411 and the controller 414 are disclosed in the U.S. Pat. No. 4,063,220, further description is omitted.

Referring now to FIG. 10, another embodiment of this invention will be described. The transmitter/receiver transmits signals from the transmission control circuit 40 by a coupler 10 to the bus 1 and takes in signals from the bus 1. When a packet is transmitted onto the bus 1, the packet detector 20 reads the type field and source address in the packet and when it detects the packet transmitted from other node is a voice packet, it transmits a reservation pulse to the reservation circuit 30. In the circuit 30, a reservation pulse from the packet detector 20 is inputted to a reset terminal of a flip-flop 321. The output from the flip-flop 321 therefore indicates "0" from the time when the reservation pulse is inputted. The reservation pulse from the detector 20 is simultaneously inputted to a delay circuit 320, to be delayed by $t_1+2\tau_0$. The letter $t_1$ denotes the length of a voice packet and $\tau_0$ denotes the maximum propagation delay. As the output from the delay circuit 320 has been inputted at the set terminal of the flip-flop 321, the output therefrom continues at "0" for the time $t_1+2\tau_0$, and then returns to "1". This output from the flip-flop 321 is outputted to the transmission controller 40 via a delay circuit 322 which delays for the time $T-2\tau_0$ wherein the letter T denotes the occurrence cycle of voice packets. In the transmission controller 40, when a data packet is inputted from a terminal 61 to the CSMA/CD controller 421, the reservation signal from the reservation circuit 30 and bus idle signal given from the CSMA/CD controller 421 are provided to an AND gate 420. As a result, only when the bus 1 is neither occupied nor reserved, a clear-to-send signal is outputted from the AND gate 420 to be CSMA/CD controller 421. Then the data packet is transmitted to the bus 1.

When a voice signal is transmitted from its own node, the voice signals received from the terminal 62 are consecutively stored in a buffer RAM (random access memory) 430. When the value of the address controller 431 which controls the address of the buffer RAM 430 exceeds a predetermined value N, the address controller 431 transmits a transmission request signal to the CSMA/CD controller 421. Based upon the request, the controller 421 sends a bus idle signal to the AND gate 420 if the bus is idle. If there is no reservation, the output from the AND gate 420 becomes "1" to send back a clear-to-send signal to the controller 421, and at the same time, the address controller 431 resets the address to start transmission of the data out of the buffer RAM 430 to the controller 421. This operation is tried at a high-speed, and the data in the buffer RAM 430 will have been transferred to the controller 421 by the time the next voice sample arrives, and the buffer RAM 430 resumes storing from the next voice sample. The controller 421 adds a type signal, a header and a CRC check signal to the voice packet before transmission. The packet transmitted from other nodes is examined of the destination address by the receiver 50 and if the address coincides, is outputted from a terminal 70. This invention does not specify the receiver 50 and it may be realized in any arbitrary manner.

FIG. 11 shows the chronological changes of portions of information in the buffer RAM 430 shown in FIG. 10. In FIG. 11, it is assumed that the node A transmits voice packets while the node B data packets. The buffer RAM 430 gradually but steadily stores voice signals from the terminal 62, and when the content exceeds a predetermined value S at the time $t_8$, the buffer RAM 430 issues a transmission request. If the bus 1 is idle and non reserved, the data of the buffer RAM 430 is transferred to a buffer (not shown) of the controller 421 and transmission of the packet is started. The address of the buffer RAM 430 is cleared by the address controller 431 to start accumulation of voice signals again. At the time $t_9$, the content of the buffer RAM 430 reached again the value S to issue a transmission-request, but the data packet has arrived from the node B by this time, and a clear-to-send signal would not be sent back until the time when the packet from the node B is completed even if the controller 421 of the node A carrier-senses it. In the meantime, the buffer RAM 430 keeps on storing voice information and after the completion of the data packet, a clear-to-send signal is inputted, therefore, from the controller 421 to the AND circuit 420 and at the time when the output therefrom is sent back, transferred to the buffer within the controller 421. The address controller 431 is cleared at this time to reset the address of the buffer RAM 430. The RAM 430 starts again storing voice signals. The voice packet which is transmitted this time is of a length slightly longer than ordinary voice packets.

The transmission start times of packets are progressively delayed from the standard cycle T but when delayed, the voice sample increased by that delay is transmitted, so that the receiver side can transmit them without packet loss by buffering. Although CSMA/CD is used as a random access system for this embodiment, this invention can naturally be applied to a CSMA system which does not have the above-mentioned collision detecting function.

What is claimed is:

1. In a packet transmission system having a plurality of nodes to be used in a packet communication system of a multiaccess type wherein bursty traffic and periodical traffic coexist and are carried by bursty packets and periodical packets respectively along a transmission path, a node circuit comprising:
   a transceiver means connected to said transmission path, and having a transmitter means for transmitting said bursty and periodical packets and a receiving means for receiving said bursty and periodical packets;
   a packet detection means connected to said transceiver means for detecting a first periodical packet which carries said periodical traffic on said transmission path;
   means connected to said transceiver means for predicting the arrival time of the next periodical packet in response to the detection of the first periodical packet by said packet detection means and for making a reservation at the predicted time for the next periodical packet; and
   said transmitting means transmitting bursty packets only when the transmission path is not reserved, whereby collision between bursty and periodical packets may be avoided.

2. A node circuit as claimed in claim 1 wherein said periodical packet is composed of a voice signal, a video signal or a picture image.

3. A node circuit as claimed in claim 1 wherein the length of said bursty packet is either equal to or less than the length of a periodical packet.

4. A packet transmission system for use in a multiaccess communication system where bursty traffic and periodical traffic coexist, and are carried by bursty packets and periodical packets, respectively, along a transmission path including:
   a plurality of transceivers connected to said transmission path, each transceiver having means for transmitting and receiving said bursty and periodical packets;
   packet detection means coupled to each transceiver for detecting whether of not a received packet or a transmitting packet is a periodical packet and generating a reservation pulse when said received or transmitting packet is a periodical packet;
   reservation means coupled to each transceiver for generating a transmission inhibition signal to inhibit said coupled transmitting means after a predetermined time is a reservation pulse fed from said packet detection means is a pulse which indicates said received packet is a periodical packet, and generating a transmission reservation signal to said coupled transmitting means to make a reservation for the subsequent periodical packet if the reservation pulse is a pulse which indicates said tramsmitting packet is a periodical packet; and said transmitting means transmitting a periodical packet if it is fed with said transmission reservation signal by said coupled reservation means, and transmitting bursty traffic if it is fed neither with said tranmission reservation signal nor said transmission inhibition signal when the transmission path is not occupied.

5. A packet transmission system, comprising:

a plurality of transceivers connected to a transmission path, each transceiver having means for transmitting and receiving bursty and periodical packets;

packet detection means coupled to each transceiver for detecting a periodical packet, and if the periodical packet is the one transmitted from other transmitting means, generating a first control pulse to inhibit a packet transmission from said coupled transmitting means, and if said periodical packet is transmitted from said coupled transmitting means, generating a second control pulse to make a reservation for the next periodical packet transmission;

reservation means coupled to each transceiver for generating a reservation signal which reserves said coupled transmitting means for transmission of a periodical packet after a predetermined amount of time in response to said second control pulse from said packet detection means and generating a transmission inhibition signal to inhibit the packet transmission from said coupled transmitting means for a fixed amount of time in response to said first control pulse from said packet detection means; and said transmitting means transmitting a periodical packet after said predetermined amount of time if the signal fed from said reservation means is a reservation signal, and transmitting a bursty packet if neither said reservation signal nor transmission inhibition signal has been supplied from said reservation means and the transmission path is not occupied.

6. A packet transmission system for use in a packet communication system of a multi-access type where butsty traffic and periodical traffic coexist, including:

a plurality of transmitting and receiving means for transmitting and receiving bursty and periodical traffic;

packet detection means coupled to each transmitting and receiving means for detecting periodical traffic;

reservation means responsive to said packet detection means coupled to said transmitting means for storing signals of periodical traffic to be transmitted, said memory outputting a transmission request signal to the transmitting means when the content thereof exceeds a predetermined value, and outputting the stored signals to said transmitting means in response to a clear-to-send signal from said transmitting means; and said transmitting means responsive to said transmission request signal for transmitting periodical packets at a time reserved in response to said reservation means, and transmitting bursty traffic in non-reserved times, said transmitting means adding bursty and periodical indicia to said bursty and periodical traffic upon transmission of same.

* * * * *